April 2, 1957   L. S. MacCALLUM   2,787,351
CONTROL DEVICES FOR MOTOR VEHICLES
Filed Oct. 28, 1954   2 Sheets-Sheet 2

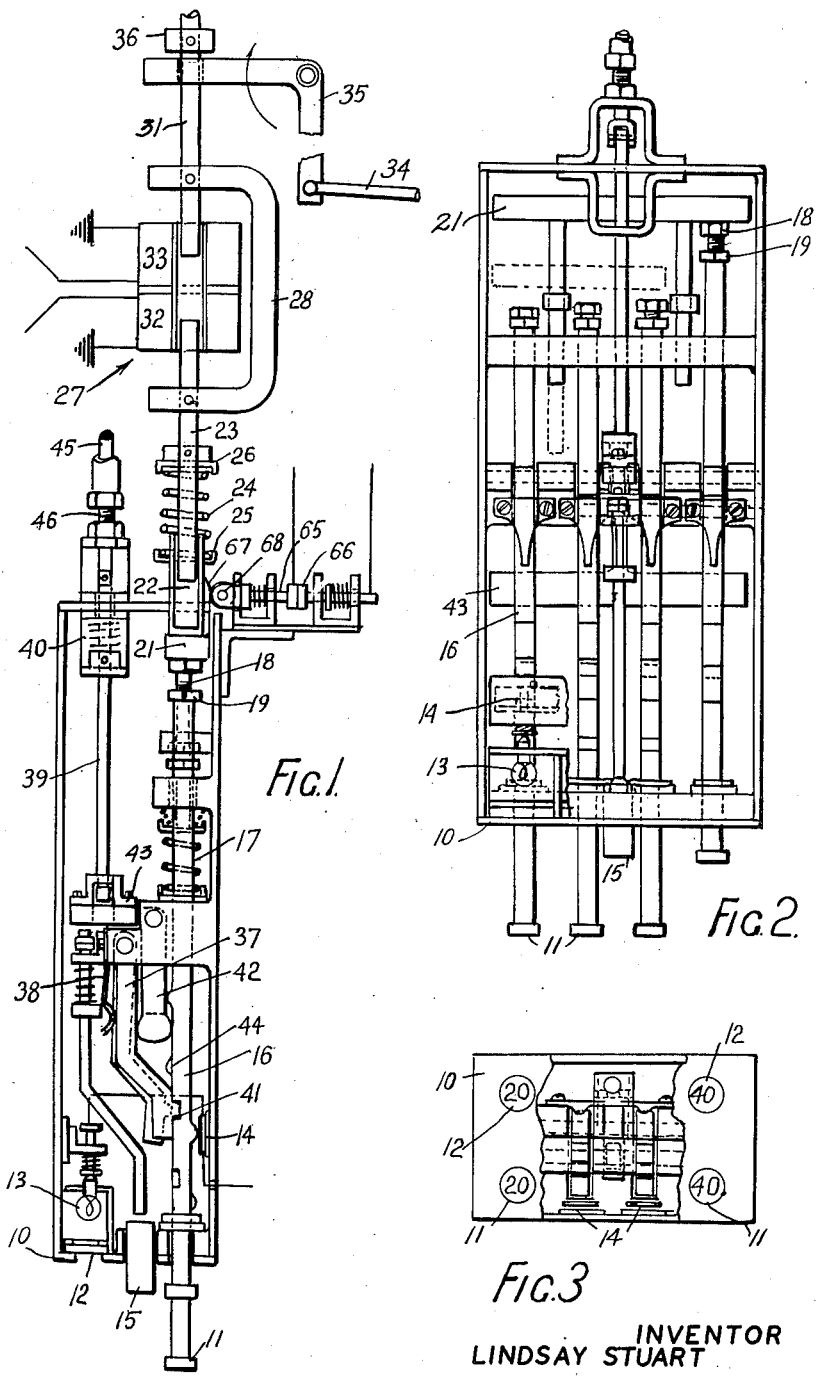

INVENTOR
LINDSAY STUART MAC CALLUM
BY Wenderoth, Lind & Ponack
Attys.

United States Patent Office 2,787,351
Patented Apr. 2, 1957

2,787,351

CONTROL DEVICES FOR MOTOR VEHICLES

Lindsay Stuart MacCallum, Dee Why, New South Wales, Australia

Application October 28, 1954, Serial No. 465,345

Claims priority, application Australia November 12, 1953

6 Claims. (Cl. 192—3)

The invention relates to a control device for motor vehicles driven by an internal combustion engine having a carburettor and throttle valve and more particularly to a device for controlling the setting of the throttle valve.

It is the normal practice in motor vehicles to arrange for the opening and closing of the throttle valve of the carburettor to be controlled by means of a spring loaded foot pedal. Where continual changes in the setting of the throttle are required, as for example when driving in a town or city, this arrangement is very satisfactory. However, when driving over long distances in open country the driver's foot is liable to become fatigued by the necessity of keeping it for long periods in a position dictated by the desired speed of the car.

An object of the present invention is to provide, for installation in a motor vehicle, apparatus whereby the throttle valve of the carburettor may be set and maintained in any one of a number of predetermined positions to maintain the speed of the vehicle substantially constant at any one of a number of predetermined speeds over level ground, without operation of the normal foot pedal, the apparatus including means whereby normal control of the throttle valve through the foot pedal may be resumed at will.

It is preferred to provide also, means for restoring normal control of the throttle automatically on pressing the foot brake pedal.

To maintain the speed of the vehicle substantially constant at the predetermined speed as far as is possible, within the available power of the engine, when ascending or descending hills, there is provided means responsive to the longitudinal inclination of the vehicle with reference to the horizontal, adapted to control the setting of the throttle in accordance with said inclination.

Figure 4:
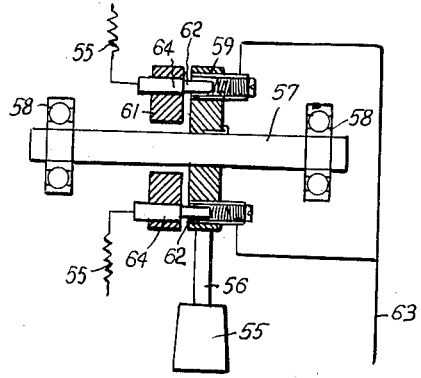
Figure 5:
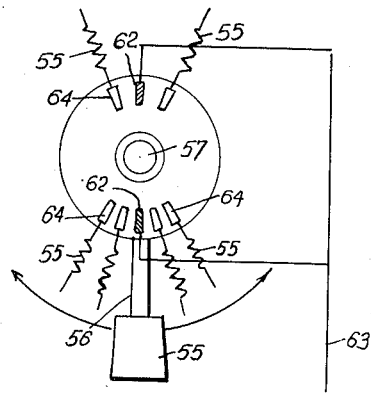
Figure 6:
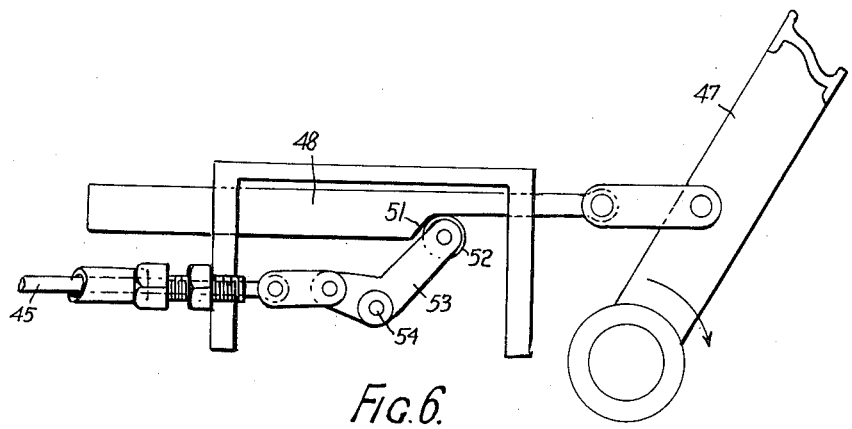

In order that the invention may be better understood a preferred embodiment thereof is hereinafter described by way of example with reference to the accompanying drawings in which:

Figure 1 is a side elevation of an apparatus according to the invention, showing at the right a solenoid arrangement for varying the throttle opening in accordance with the inclination of the car, Figure 2 is a plan view of the left hand part of Figure 1 in which some parts are omitted for clarity, Figure 3 is an end view of Figure 2, part of the casing being shown broken away, Figure 4 is a diagrammatic view of a means responsive to the longitudinal inclination of the vehicle, Figure 5 is a diagram of the circuit connections for the device shown in Figure 4 and Figure 6 is an elevation of means actuated by the foot brake pedal for restoring the normal control of the throttle valve.

In the preferred embodiment there is provided a small panel 10 designed to fit into the dashboard of a motor vehicle. Projecting from the surface of the panel is a row of four knobs 11 (any desired number of knobs may of course be used) on each of which is engraved a number indicative of the approximate speed of the vehicle obtainable by pressing the knob. Above the row of buttons is a row of transparent or coloured windows 12 each bearing the same number as the knob below it. Behind each window 12 is placed an electric lamp 13 which is connected in an electrical circuit including a switch 14 such that when a knob 11 is pressed the corresponding lamp 12 is lighted. Projecting from about the centre of the panel is a single spring loaded knob 15 which may be operated to restore control of the throttle of the vehicle to the foot pedal in the manner described below.

Each of the knobs 11 is attached to one end of a rod 16 which is spring loaded by means of the spring 17 so as to tend to resist pressure on the knob to move it towards the surface of the panel. The effective length of each rod 16 is adjustable by means of a threaded extension 18 screwed into the other end of the rod and projecting from it, which may be screwed into or out of the rod and locked in any desired position by means of the nut 19. A bar 21 is mounted so as to lie transversely across the end of the rods in such a way that if any of the knobs is pressed the bar is pushed forwardly a distance depending on the effective length of the rod 16 to which the knob is attached. An operative connection is provided between the bar and the throttle valve of the carburettor so that for any given position of the bar 21 the throttle valve will take up a corresponding position.

The connection to the throttle valve is by means of a sleeve 22, attached to the bar, into which one end of the steel rod 23 fits. The two are connected by means of the spring 24 which lies between the collar 25, attached to the sleeve 22 and collar 26, attached to the rod 23. The arrangement is such that pressure on one of the knobs 11 to set the bar in a predetermined position will produce a similar movement of the rod 23. However once bar 21 is set, subsequent movement of the rod 23 by means of the solenoid 27 will not cause it to move.

The rod 23 is linked by a yoke 28 to a second similar rod 31 which is connected to the throttle valve (not shown). The solenoid 27 has two windings 32 and 33 one end of each of which is connected to earth. The mode of operation of this part of the apparatus is described below.

It will be appreciated that if any knob is pressed the throttle valve will take up a definite predetermined position. The arrangement can be adjusted so that on level ground the throttle opening corresponding to any particular knob 11 will cause the vehicle to travel at a speed over level ground roughly equal to the indication on the knob. The connection between the bar 21 and the throttle valve is such that the pressing of the knob to an "in" position opens the throttle to a predetermined extent but leaves it free to be opened to any greater extent up to the maximum by pressure on the normal foot pedal, which acts through the rod 34, bell-crank lever 35 and collar 36 on rod 31.

To hold any knob in the "in" position a locking means is provided comprising a pivoted lever 37 spring loaded by spring 38 which, when a knob is pushed inwardly, engages a notch 41 in the rod 16 to which the knob is attached. This prevents the loading spring 17 on the rod 16 from returning the knob to its original position when finger pressure on it is released. Over each rod is mounted a bell-crank lever 42, one arm of which lever is welded to the underside of a common cross-piece 43; the bell-crank levers 42 and the cross-piece 43 provide the means for releasing any knob that has been pushed to the "in" position. This may be done in any of the following ways:

(1) By pushing the centre knob 15 of the panel, which has the effect of moving the cross-piece 43 so as to cause the other arm of all the bell-crank levers 42 to move upwardly to disengage any one of the levers 37 which may be engaged in the notch 41 of the rod 16 of a knob 11 in the "in" position and thus release the knob and restore the throttle valve to full control by the foot pedal;

(2) By pushing in any other knob 11; when this is done a protuberance 44 on the rod of the knob pressed acts on the bell-crank lever 42 associated with that rod, and, through the cross-piece 43, on all the other bell-crank levers to release the button previously pressed; the throttle valve is then set at an opening corresponding to the indication on the button now in the "in" position;

(3) By actuating the foot brake, an operative connection is provided between the foot brake and the cross-piece so that on depressing the foot brake the cross-piece is moved to release any button in the "in" position and restore normal foot pedal control as described under (1) above.

The connection between the foot brake and the cross-piece 43 is by means of a rod 39 which is connected through the spring 40 and screw adjuster 46 to rod 45 which is operable by the foot brake in the manner shown in Figure 6.

The foot brake pedal 47 is attached to a brake operating rod 48 which has on it a cam surface 51. This is in contact with a roller 52 mounted on one arm of the bell-crank lever 53 which is pivoted at 54.

Pressure on the pedal 47 causes the rod 48 to move forward and thus depress the roller 52; this movement is transmitted to the cross-piece 43 which acts on the levers 42 to release any button that has been pressed and thus restore normal foot pedal control of the throttle valve.

In order to maintain the speed of the vehicle approximately at the predetermined value, that is to say at the speed shown on the knob pressed, when ascending or descending hills the position of the throttle is automatically adjusted according to the inclination of the vehicle; this is effected by the apparatus shown in Figures 4, and 5 acting through the solenoid 27 shown at the right of Figure 1.

In the apparatus 55 is a weight suspended on an arm 56 which is mounted on the axle 57. Axle 57 is mounted transversely of the vehicle and is freely rotatable in the ball races 58. The weight hangs substantially vertically at all times irrespective of the inclination of the car.

Keyed to the axle 57 is a disc 59 of insulating material opposite which is a similar disc 61 which is fixed relative to the frame of the vehicle. Due to the weight 55 a change in the longitudinal inclination of the vehicle produces relative rotational movement between discs 59 and 61.

In the disc 59 are two spring loaded contacts 62 connected to a common lead 63. In the disc 61 are a number of fixed contacts 64 each connected to a resistance 55. This apparatus is connected in circuit between the battery of the vehicle, to which the lead 63 is connected and the solenoid 27, to one or other winding of which all the leads from the resistances 55 are connected. All the resistances in the lower bank of Figure 5 and to the left of the figure and the resistance to the right of the figure in the upper bank are connected to the winding 32 of the solenoid and the remainder to the winding 33.

The ohmic values of the resistance of the lower bank on each side decrease from the centre line outwards. The value of each of the resistances of the upper bank is intermediate between that of the lower two on the opposite side. The provision of the upper bank of resistances is merely to avoid spacing the contacts 64 too closely. When the spring contact 62 is resting on one of the upper contacts 64 the lower contact 62 is resting in the space between two adjacent contacts.

In the position shown in Figure 6 neither winding of the solenoid is energised and the rods 23 and 31 and thus the throttle valve, take up a position according to the setting of the bar 21. If, however, the car is tilted longitudinally when ascending or descending a hill, relative movement of the discs 59 and 61 takes place and one or other of the windings 32 or 33 of the solenoid is energised. Energisation of winding 32 attracts the rod 23 into the solenoid and acts to open the throttle valve, energisation of winding 33 has the opposite effect.

The degree of energisation of either winding depends on the magnitude of the relative movement between the discs and thus the inclination of the vehicle to the horizontal. The greater the movement, the lower the value of resistance brought into circuit and thus the greater the current in the winding and the adjustment of the throttle valve from its present position. A return of the car to level ground will result in the return of the discs 59 and 61 to the neutral position shown in Figure 6 and of the throttle valve to its present position.

In order that the solenoid 27 can be energised only when a button has been pressed, a switch comprising spring loaded contacts 65 and 66 is provided. This switch is placed in the circuit between the battery and lead 63. The switch is operated by means of a cam surface 67 on the sleeve 22 which acts on the roller 68 when the bar 21 is moved forward. The solenoid 27 is prevented from interfering with normal control of the throttle as the contacts 65 and 66 are spring loaded to the open position thus interrupting the supply of current to the solenoid.

The necessary adjustment of the apparatus to provide a substantially constant speed at any setting of the buttons is carried out on the particular vehicle in which the apparatus is installed.

The embodiment described above is given only by way of example and as will be obvious to those skilled in the art a wide variety of constructions may be employed within the scope of the invention as broadly claimed.

I claim:

1. In a motor vehicle, apparatus comprising manually operable means accessible to the driver of the vehicle, a throttle valve, a connection between said means and the throttle valve such that the throttle valve may be set in any one of a number of predetermined positions in accordance with the operation of said means, further manually operable means connected to said first mentioned means, by operation of which normal foot control of the throttle valve may be restored, means responsive to the longitudinal inclination of the vehicle with reference to the horizontal, and an operative connection between said inclination responsive means and the throttle valve comprising motor means controlled by the inclination responsive means to alter the setting of the throttle valve in accordance with alterations in the longitudinal inclination of the vehicle to maintain the speed of the vehicle at approximately a predetermined speed when ascending or descending hills.

2. In a motor vehicle, apparatus comprising manually operable means accessible to the driver of the vehicle, a throttle valve; a connection between said means and the throttle valve such that the throttle valve may be set in any one of a number of predetermined positions in accordance with the operation of said means, a foot brake pedal, further manually operable means connected to said first mentioned means by operation of which normal foot control of the throttle valve may be restored and comprising connection between said first mentioned means and the foot-brake pedal of the vehicle such that operation of that pedal after operation of said first manually operable means restores normal foot pedal control of the throttle valve, means responsive to the longitudinal inclination of the vehicle with reference to the horizontal, and an operative connection between said inclination responsive means and the throttle valve comprising motor means controlled by the inclination responsive means to alter the setting of the throttle valve in accordance with alterations in the longitudinal inclination of the vehicle to maintain the speed of the vehicle at approximately a predetermined speed when ascending or descending hills.

3. In a motor vehicle, apparatus as claimed in claim 1, wherein the means responsive to the longitudinal inclination of the vehicle includes a weight pivotally supported on an axle set transversely in the vehicle and electric switch means associated therewith and the motor means comprises an electro-magnetic solenoid, the arrangement being such that longitudinal inclination of the car produces a relative motion between parts of the switch means to energise the solenoid to act to open or close the throttle, the degree of opening or closing being proportional to the inclination of the vehicle.

4. In a motor vehicle, apparatus as claimed in claim 2, wherein the means responsive to the longitudinal inclination of the vehicle includes a weight pivotally supported on an axle set transversely in the vehicle and electric switch means associated therewith and the motor means comprises an electro-magnetic solenoid, the arrangement being such that longitudinal inclination of the car produces a relative motion between parts of the switch means to energise the solenoid to act to open or close the throttle, the degree of opening or closing being proportional to the inclination of the vehicle.

5. In a motor vehicle, apparatus comprising a throttle valve, a panel set in the dash board of the vehicle, a plurality of buttons projecting therefrom, a connection between said buttons and the throttle valve such that the throttle valve may be set in any one of a number of predetermined positions by pressing one of said buttons, further manually operable means connected to said buttons, by operation of which normal foot control of the throttle valve may be restored, means responsive to the longitudinal inclination of the vehicle with reference to the horizontal, and an operative connection between said inclination responsive means and the throttle valve comprising motor means controlled by the inclination responsive means to alter the setting of the throttle valve in accordance with alterations in the longitudinal inclination of the vehicle to maintain the speed of the vehicle at approximately a predetermined speed when ascending or descending hills.

6. In a motor vehicle apparatus as claimed in claim 5 wherein the further manually operable means comprises a further button on said panel and a connection between said further button and the other buttons whereby pressure on said further button releases any button previously pressed.

References Cited in the file of this patent
UNITED STATES PATENTS

| | | |
|---|---|---|
| 2,270,002 | Glick | Jan. 13, 1942 |
| 2,477,865 | Du Charme | Aug. 2, 1949 |
| 2,503,066 | Plensler | Apr. 4, 1950 |
| 2,604,115 | Munson | July 22, 1952 |
| 2,666,510 | Pokorny | Jan. 19, 1954 |